May 27, 1958 J. R. TEMPLIN 2,836,639
CONSTANT TEMPERATURE DEVICE
Filed June 2, 1955 2 Sheets-Sheet 1

Inventor:
Jackson R. Templin
by, Richard E. Hosley
His Attorney

May 27, 1958      J. R. TEMPLIN      2,836,639
CONSTANT TEMPERATURE DEVICE

Filed June 2, 1955      2 Sheets-Sheet 2

Inventor:
Jackson R. Templin
by, Richard E. Hosley
His Attorney

United States Patent Office 2,836,639
Patented May 27, 1958

2,836,639

CONSTANT TEMPERATURE DEVICE

Jackson R. Templin, Marblehead, Mass., assignor to General Electric Company, a corporation of New York Application June 2, 1955, Serial No. 512,643

5 Claims. (Cl. 136—4)

My invention pertains to temperature measuring apparatus and particularly to temperature measuring apparatus having a thermocouple cold junction which is to be maintained at some constant temperature regardless of changes in ambient temperature.

In thermoelectric pyrometry, temperatures are measured by means of the change with temperature of the electromotive force of a thermocouple. The conventional thermocouple comprises a pair of electrical conductors of dissimilar materials joined at opposite ends so that a thermal electromotive force is generated when a temperature differential exists between the junctions. It is customary to place one junction at the point to be measured and the second junction at another point where its temperature is maintained constant. The second junction is commonly referred to as the "cold junction," since it had been the practice to maintain this junction at 32° F. by placing it in a melting ice bath. Commercial practices often make the use of the ice bath impractical and inconvenient. The cold junction of a thermocouple may be maintained at a constant temperature by placing it in an insulated enclosure with an electric heater adapted to be energized under regulation. Means for detecting changes in temperature of the cold junction is also provided which effectuates regulation of the heater energization. Where the means is a temperature sensitive impedance which is a component of an A.-C. excited bridge network, the control depends upon the balancing of the bridge. Ambient temperature changes however affect the stability of the bridge operation. When the temperature sensing means is a resistance, the operating voltage placed upon the bridge must be kept low to maintain the amount of heating of the temperature sensing means at a low level. Low level operating voltage requires sensitive control equipment to detect and receive signals emanating from the bridge. The successful operation of the measuring apparatus of my invention depends upon the maintenance of a constant temperature of the cold junction. This in turn is dependent upon rapid and accurate sensing of the temperature of the junction especially where there is a possibility of change therein.

It is therefore an object of my invention to reduce the effect of ambient temperature on the cold junction of a temperature measuring apparatus.

It is also an object of my invention to increase the operating stability of an A.-C. bridge held in conjunction with temperature sensing means to maintain a thermocouple cold junction at a constant temperature.

It is a further object of my invention to make possible the use of an A.-C bridge at higher voltages than heretofore possible in controlling the temperature of a thermocouple cold junction.

It is a still further object to provide improved structure for a cold junction which is to be maintained at a constant temperature.

In carrying out my invention in one form, I employ a thermocouple junction in thermally insulated enclosure, an electric heater coil in thermal relation with the thermocouple junction, and a temperature sensitive impedance in thermal contact with the thermocouple junction. In a preferred embodiment, the temperature sensitive impedance constitutes one arm of an A.-C. bridge network. Stability is greatly improved, however, if at least one additional impedance component of the bridge is also in the enclosure in thermal relation with the thermocouple junction.

In practicing my invention so that a higher voltage may be placed upon the bridge circuit, I employ reactance, which may be either a capacitor or an inductor having a negligible resistance, having a high temperature coefficient. The "real power" which would otherwise be dissipated within the enclosure by an impedance having a substantial resistance characteristic is thereby eliminated.

In the embodiment of my invention where the temperature sensing means and the bridge circuit are resistances, a compact cold junction unit assembly may be provided having a support member adapted to have a thermocouple cold junction affixed thereto with the temperature sensitive and heater means in intimate thermal contact with each other. In one form the support may be a ceramic tubular element having the heater embedded therein and the temperature sensitive means wound around the junction and support.

In a modified embodiment, the support member and the thermocouple leads are physically joined so as to form an enlarged thermocouple junction upon which the temperature sensitive and heater means may be wound to affect the intimate thermal contact. In this embodiment, structural means is provided so that temperature control of the junction is effectuated by conduction of heat from the heater means with means to limit the rate of conduction. By making the junction larger in surface area, the ability of the sensing element to detect changes is greatly enhanced, whereas the use of means to limit the change of conduction provides a uniformity of temperature throughout the entire junction.

The scope of the invention is defined in the appended claims, with greater particularity, while further advantages and objects may be better understood and more fully appreciated by reference to the following detailed description in which:

Figure 1:
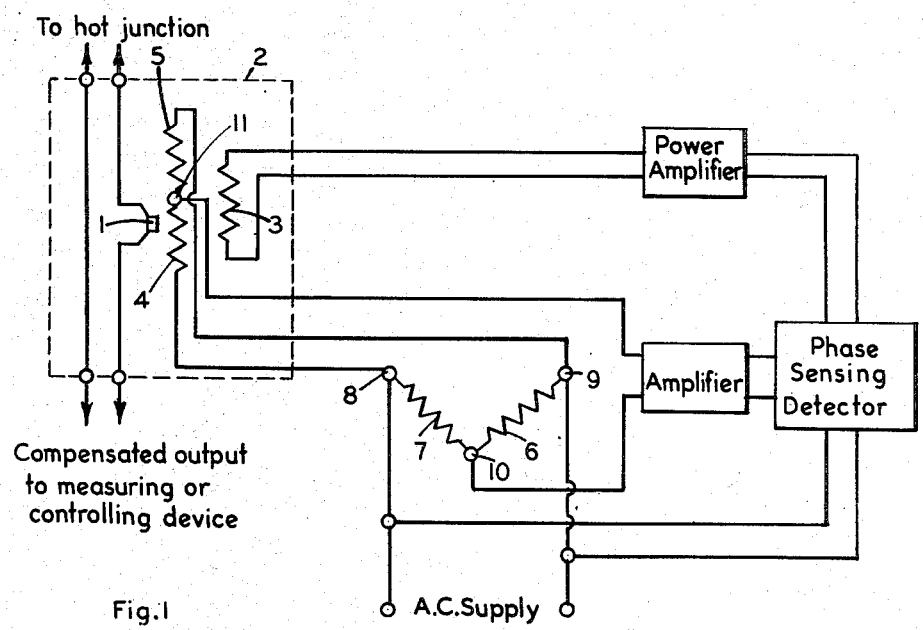
Figure 1 is a circuit diagram showing schematically a temperature measuring apparatus employing my invention.

Referring to the circuit diagram of Figure 1, a temperature measuring apparatus is disclosed having a cold junction 1, which is part of a thermocouple circuit including a meter not shown, inside an appropriately insulated enclosure 2 with a heater means, such as coil 3, and a temperature sensitive impedance 4, which may be an electric element having properties of inductance resistance or capacitance. The temperature sensitive impedance 4 is a component of a bridge circuit, having impedances 5, 6, and 7, which is adapted to be energized by an alternating voltage in the usual manner at junctions 8 and 9. Upon unbalancing of the bridge circuit due to a change in temperature within the enclosure, a signal will appear across the bridge at junctions 10 and 11. This signal is amplified by a suitable amplifier which may be a conventional audio-frequency type A.-C. amplifier. The amplified signal is then fed to a phase sensing detector including a filter of any well-known type capable of distinguishing the difference between the input phase of alternating voltage source and the unbalance signal phase. The phase sensing detector and filter then controls a power amplifier, preferably of an electronic type, which in turn regulates the supply of electric current to the heater coil in the enclosure. Figure 1 illustrates my invention in one form where an additional component of the bridge circuit is within the insulated enclosure with the temperature sensitive somponent. It has been found that the stability of operation of the temperature measuring apparatus as a whole and the control means in particular is greatly enhanced by the inclusion of at least one additional bridge element within the insulated enclosure so that it is subjected to the constant temperature conditions of the enclosure. Thus, ambient conditions may change as to the rest of the bridge circuit but will not affect the stability of operation to an appreciable extent.

Figure 2:
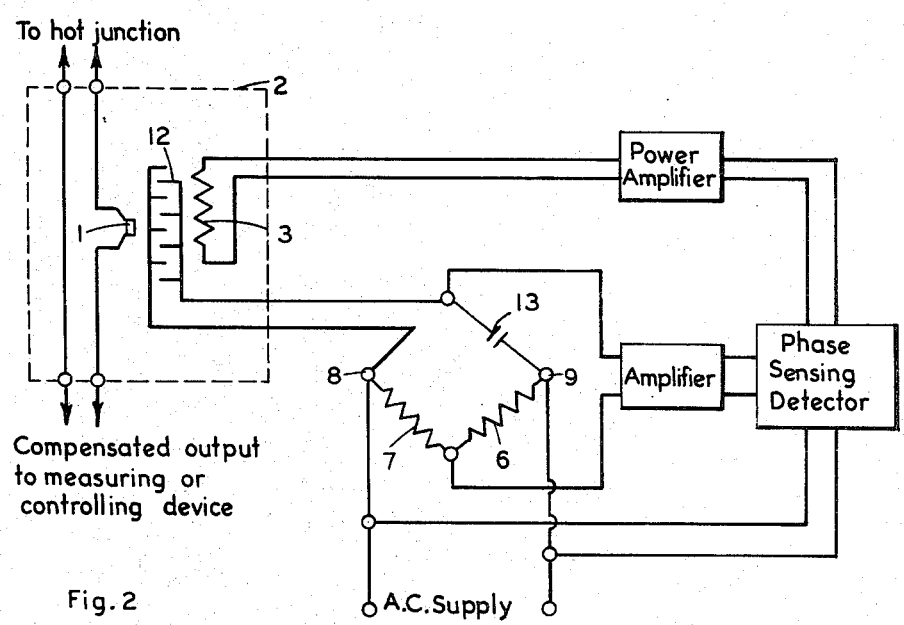
Figure 2 is a circuit diagram showing schematically a temperature measuring apparatus using a second feature of my invention.

Figure 2 illustrates another aspect of my invention wherein the temperature sensitive impedance component in the enclosure is a capacitor 12. To make possible a balanced bridge, a capacitor 13 is included in the adjacent arm. The use of capacitor 12 makes possible a higher bridge energizing alternating voltage so as to provide stronger signals to the control amplifier. The advantage of this is to eliminate or reduce the heating effect of real power dissipation of impedances having substantial resistance characteristic. An even greater improvement in the operation of the temperature measurement apparatus may be acquired by placing an additional component of the bridge, such as capacitor 13, within the enclosure with the temperature sensitive capacitor 12 to thereby eliminate the effect of ambient temperature on the bridge circuit while at the same time acquiring the advantage of reduced heating effect which the capacitors were intended to achieve.

Figure 3:
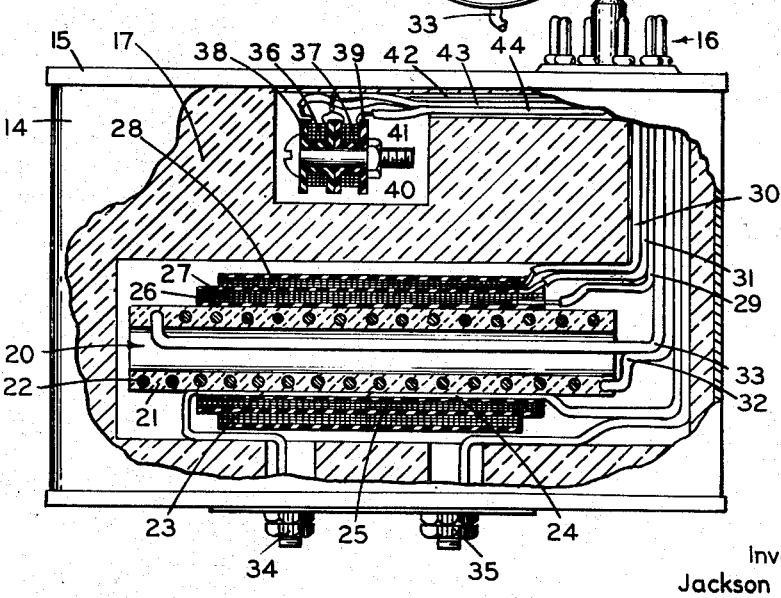
Figure 3 is a cross-section view of a cold junction unit assembly depicting the structural details thereof.

In the operation of the measurement apparatus of my invention, best results are achieved if the elements to be maintained at constant temperature are part of a unitary assembly. For purposes of description, the unitary assembly has been termed a cold junction unit assembly and as disclosed in Figure 3 is in its setting within an enclosure which may be any appropriate container, such as 14, having a cover 15 in which is mounted a terminal connector 16 of any suitable type to provide terminals for the electrical elements within.

The cold junction unit assembly, generally designated by the numeral 20, which is insulated within the enclosure 14 by suitable insulating material 17, comprises a support member 21, which in one embodiment may be of ceramic material, in which is embedded a heater coil 22. A thermocouple junction comprising a pair of thermocouple leads 23 and 24 is affixed to the support member 21 by an electric insulating tape 25 so as to be in thermal contact with the support member. Around the thermocouple junction is wound a temperature sensitive coil 26 so as to be in thermal contact with the thermocouple junction and the support member. Electric insulation 27 separates the temperature sensitive coil from another coil 28 having a low temperature coefficient. External electric connections are made from one side of coil 26 by lead 29, from one side of coil 28 by lead 30, and from the common connection of coils 26 and 28 by lead 31 to appropriate terminals on the cover 15 of container 14. Similarly leads 32 and 33 connect the opposite ends of heater coil 22 to appropriate terminals. Terminals 34 and 35 may be also provided on container 14 to permit external connection of the thermocouple leads to an external measuring circuit. In some applications of my invention, it may be desirable to include all elements of the bridge circuit in the insulated enclosure, or it may be that compactness can be achieved by placing the remaining bridge components in the container without necessarily insulating them. The latter is shown in Figure 3 where coils 36 and 37 on spools 38 and 39 are mounted on a conventional nut 40 and bolt 41 unit. External connections are appropriately made through leads 42, 43, and 44 to complete the bridge circuit at the terminals or at any other point with the temperature sensitive coil 26 and coil 28.

As thus described, the cold junction unit assembly is compact and assures an intimacy of thermal contact desirable to enable accuracy and rapidity of response to temperature changes. At the same time the stability to be obtained by maintaining an additional component of the bridge circuit at a constant temperature is realized both simply and efficiently by making it a part of a single assembly.

Figure 4:
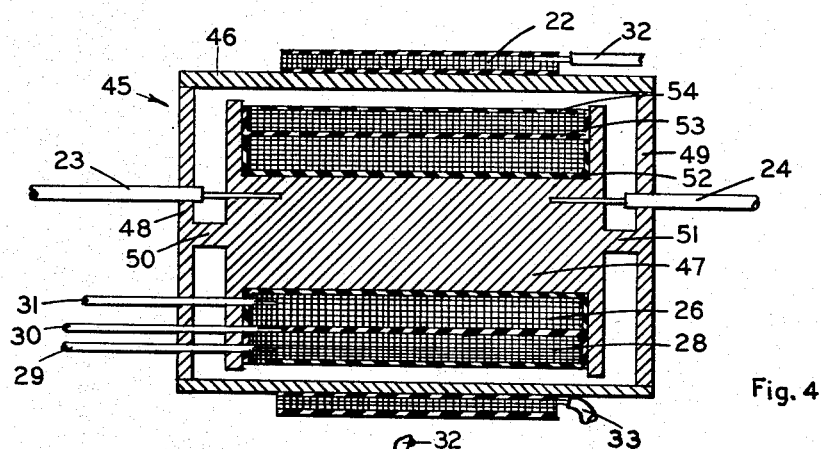
Figure 4 is a cross-section view of a modified cold junction unit assembly depicting structural details thereof.
Figure 5:
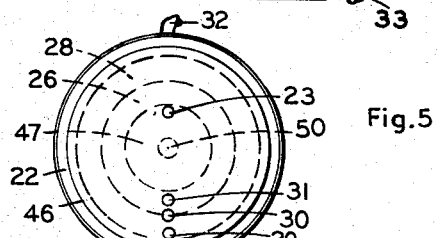
Figure 5 is an end view of the cold junction unit assembly of Figure 4.

An alternative embodiment of the cold junction unit assembly is disclosed in Figures 4 and 5 and comprises a unitary support member having a first metallic element, such as spool 45, and a second metallic element, such as tubular member 46, adapted to be concentrically arranged. Spool 45 comprises a main body portion 47 and a pair of oppositely disposed end plates 48 and 49 connected to the main body portion on opposite ends thereof by reduced portions 50 and 51 which may be integral parts therewith. The end plates and the main body portion are designed with end plates that are oversize so that when the spool is assembled within the tubular member, thermal contact is made between the end plates and the inner surface of the tubular member forming an enclosed volume around the main body portion of the spool.

As in the embodiment of Figure 3, temperature sensitive coil 26 and another coil 28, components of a bridge, are wound concentrically about the main body portion 47 of the spool 45 and are appropriately insulated therefrom and from each other by suitable electrical insulating tape, such as 52, 53, and 54. A heater coil 22, having appropriate leads 32 and 33, is wound with suitable electric insulation around the outer surface of tubular element 46. Thermocouple leads 23 and 24 are connected through openings in the end plates, from which they are electrically insulated, into the main body portion 47 of the spool 45. Other openings are provided in end plate 48 to permit external connection to the coils within the enclosed volume by leads 29, 30, and 31.

In the alternative embodiment of Figures 4 and 5, the spool 45 and tubular member 46 are preferably metal having high coefficient of thermal conductivity, such as copper or aluminum. In construction, the end plates are made oversize with respect to the main body portion so that, when the spool 45 is inserted within tubular member 46, thermal contact is made between the end plates 48 and 49 and the inner surface of tubular member 46. The end plates and tubular member cooperate to form an enclosed volume about the main body portion of the spool with its associated windings. The thermal contact between the main body portion, and hence the coils thereon, and the tubular member, and hence the heater coil, is through convection from the air within the enclosed volume and through conduction by means of reduced connections between the main body portions and the end plates.

The reduced connections 50 and 51 may be designed to limit the rate of conduction from heater coil 22 to a desirable value so that the thermal restriction in combination with the thermal mass of the main body portion effects a thermal filtering action which reduces the temperature variations of the heater and tubular member caused by external disturbances from influencing the main body portion temperature. Thus, it is intended that the main body portion 47 of spool 45, which is essentially the cold junction, as well as the temperature sensing winding 26 and any other windings which may be included on the spool 45 are heated at a uniform rate from all sides to aid in the establishment of a constant temperature cold junction.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desired to secure by Letters Patent of the United States is:

1. In a temperature measuring apparatus the combination comprising a thermocouple cold junction, an insulated enclosure for said cold junction, electric heater means in said enclosure in intimate thermal contact with said cold junction, means for supplying current to said electric heater means, control means for regulating the supply of current to said heater means so as to maintain said cold junction at a constant temperature and including an A. C. bridge, and a temperature sensitive impedance in one arm of said bridge in said enclosure in intimate thermal contact with said cold junction and said heater means, and a second impedance in another arm of said bridge in said enclosure in intimate thermal contact with said temperature sensitive impedance.

2. In a temperature measuring apparatus the combination comprising a thermocouple cold junction, an insulated enclosure for said cold junction, electric heater means in said enclosure in intimate thermal contact with said cold junction, means for supplying current to said electric heater means, control means for regulating the supply of current to said heater means so as to maintain said cold junction at a constant temperature and including an A. C. resistance bridge, a temperature sensitive resistor in one arm of said bridge in said enclosure in intimate thermal contact with said cold junction and said heater means, and at least one other resistor of the resistance bridge in said enclosure.

3. In a temperature measuring apparatus the combination comprising a thermocouple cold junction, an insulated enclosure for said cold junction, electric heater means in said enclosure in intimate thermal contact with said cold junction, means for supplying current to said electric heater means, control means for regulating the supply of current to said heater means so as to maintain said cold junction at a constant temperature and including an A. C. resistance bridge, a temperature sensitive resistor in one arm of said bridge in said enclosure in intimate thermal contact with said cold junction and said heater means, and at least one other resistor of the resistance bridge in said enclosure in intimate thermal contact with said temperature sensitive resistor.

4. A cold junction unit assembly adapted to be maintained at a fixed temperature inside an insulated enclosure comprising a cylindrical support member, an electric heater coil means embedded in said support member, said heater coil means adapted to maintain said cold junction unit at said fixed temperature, a thermocouple junction affixed to the outer surface of said support member in thermal contact therewith, a temperature sensitive resistor coil adapted to be in one arm of an A. C. resistance bridge for controlling the supply of current to said heater means wound externally on said support member in thermal contact with said thermocouple junction and the outer surface of said support member, and a second resistor coil having a relatively low thermal coefficient of resistance and adapted to be in a second arm of said A. C. bridge wound about said temperature sensitive resistor coil and electrically insulated therefrom.

5. A cold junction unit assembly adapted to be maintained at a fixed temperature inside an insulated enclosure comprising a support member, electric heater means in thermal contact with said support member adapted to maintain said cold junction unit at said fixed temperature, a thermocouple junction affixed to said support member in thermal contact with said support member, a temperature sensitive resistor component of an A. C. bridge in thermal contact with said support and said thermocouple junction, said resistance bridge being adapted to regulate the supply of current to said heater means, and at least one other resistor element of said bridge on said support member.

References Cited in the file of this patent

UNITED STATES PATENTS

| | | |
|---|---|---|
| 1,228,678 | Johnson | June 5, 1917 |
| 1,327,800 | Beighlee | Jan. 13, 1920 |
| 1,411,033 | Jensen | Mar. 28, 1922 |
| 2,275,317 | Ryder | Mar. 3, 1942 |
| 2,697,735 | Knudsen | Dec. 21, 1954 |